US012329256B2

(12) United States Patent
Bryant et al.

(10) Patent No.: US 12,329,256 B2
(45) Date of Patent: Jun. 17, 2025

(54) MODULAR WALLET ASSEMBLY

(71) Applicants: Aaron Bryant, Dix Hills, NY (US); Kevin Bryant, Dix Hills, NY (US)

(72) Inventors: Aaron Bryant, Dix Hills, NY (US); Kevin Bryant, Dix Hills, NY (US)

( * ) Notice: Subject to any disclaimer, the term of this patent is extended or adjusted under 35 U.S.C. 154(b) by 0 days.

(21) Appl. No.: 18/429,711

(22) Filed: Feb. 1, 2024

(65) Prior Publication Data

US 2024/0225220 A1 Jul. 11, 2024

Related U.S. Application Data

(62) Division of application No. 17/222,152, filed on Apr. 5, 2021, now Pat. No. 11,937,673.

(51) Int. Cl.
*A45C 11/18* (2006.01)
*A45C 15/00* (2006.01)
*B26B 11/00* (2006.01)

(52) U.S. Cl.
CPC ............ *A45C 11/182* (2013.01); *A45C 15/00* (2013.01); *B26B 11/00* (2013.01)

(58) Field of Classification Search
CPC ........ A45C 11/182; A45C 15/00; B26B 11/00
See application file for complete search history.

(56) References Cited

U.S. PATENT DOCUMENTS 1,736,651 A * 11/1929 Glaenzer ................. A24F 15/12 206/256
4,697,698 A 10/1987 Holdener
5,815,843 A * 10/1998 Brillhart, III ............. A45F 5/02 190/110
7,900,757 B2 * 3/2011 Sisitsky ................. A45C 11/20 190/110
8,863,792 B2 * 10/2014 Kataoka ................. B60K 15/04 220/86.2
8,899,411 B2 * 12/2014 Van Geer ............. A45C 11/182 206/39.4
8,985,387 B2 3/2015 Kobayashi
10,178,901 B2 1/2019 Chan et al.
10,630,333 B1 4/2020 Mossoba et al.
10,667,588 B2 6/2020 Chan et al.
10,791,808 B2 10/2020 Kane
10,893,731 B2 1/2021 Wingerter et al.
11,234,502 B2 2/2022 Van Geer
11,937,673 B2 3/2024 Bryant et al.
2004/0154714 A1 8/2004 Gray
2005/0224149 A1 10/2005 Tiscione
2009/0044827 A1 * 2/2009 Zilber .................... A45D 40/24 132/297
2014/0060712 A1 3/2014 Beckley
2014/0228082 A1 * 8/2014 Morrow ............... H04B 1/3888 455/575.8
2017/0202324 A1 7/2017 Van Geer
2018/0338593 A1 11/2018 Scharnigg et al.
2020/0315308 A1 10/2020 Van Geer

* cited by examiner

*Primary Examiner* — Tri M Mai
(74) *Attorney, Agent, or Firm* — George Likourezos; Carter, DeLuca & Farrell LLP

(57) ABSTRACT

A modular wallet assembly including a casing, a rail fixed to the casing, and an accessory configured to be detachably coupled to the casing via the rail. The modular wallet assembly further includes a lever arm configured to dispense personal cards stored in the casing.

15 Claims, 9 Drawing Sheets

MODULAR WALLET ASSEMBLY

CROSS-REFERENCE TO RELATED APPLICATIONS AND CLAIM OF PRIORITY

This application is a Divisional of and claims the benefit of, and priority to, U.S. patent application Ser. No. 17/222,152, filed on Apr. 5, 2021, the entire contents of which are hereby incorporated herein by reference.

BACKGROUND

Technical Field

The present disclosure relates generally to wallets. More particularly, the present disclosure relates to modular wallets configured for detachably coupling to various accessories.

Background of Related Art

Wallets are an important personal item to assist people with carrying money, pictures, keys, receipts, credit cards, and other items valuable in both monetary and personal value. However, due to the construction of most wallets, accessing personal cards stored in the wallet may be difficult. In addition, current wallets typically do not provide for the attachment of various accessories.

SUMMARY

In one aspect of the present disclosure, a modular wallet assembly is provided and includes a housing and a lever arm. The housing includes an opened top end and an opposite bottom end. The housing defines an internal chamber and a longitudinal axis extending between the opened top end and the bottom end. The lever arm is disposed at the bottom end of the housing and is configured to pivot relative to the housing between a first position and a second position. The lever arm has a plurality of steps each configured to engage a respective personal card of a plurality of personal cards. The steps of the lever arm are configured to urge the personal cards along the longitudinal axis of the housing and out of the opened top end of the housing at discrete distances when the lever arm is pivoted from the first position toward the second position.

In aspects, the lever arm may have a finger actuation button extending outside of the housing.

In aspects, the lever arm may extend perpendicularly relative to the longitudinal axis when in the first position, and parallel with the longitudinal axis when in the second position.

In aspects, the modular wallet assembly may further include a biasing member configured to resiliently bias the lever arm toward the first position.

In aspects, the modular wallet assembly may further include a base fixed in the bottom end of the housing. The lever arm may define a central opening disposed between opposing ends portions of the lever arm. The biasing member may be a torsion spring having a first end fixed to the lever arm, and a second end fixed to the base.

In aspects, the modular wallet assembly may further include an elongated element fixed within the housing and extending along a longitudinal side wall of the housing. The elongated element may be configured to guide the personal cards along the longitudinal axis.

In aspects, the elongated element may have an end fixed to an end of the base.

In aspects, each of the steps may have an arcuate edge configured to engage a bottom edge of the respective personal cards.

In aspects, the modular wallet assembly may further include a rail configured to be fixed to the housing. The rail may be configured to couple an accessory to the housing.

In aspects, the rail may have an elongated body and a first extension extending laterally outward from a first side of the elongated body. The first extension may be configured for slidable receipt in a corresponding channel defined in the accessory.

In aspects, the first extension of the rail may have a flange extending along a length of the first extension. The flange may be configured to prevent the accessory from separating laterally from the rail.

In aspects, the flange may have a first end defining a first recess therein, and an opposite second end defining a second recess therein. The accessory may include a movable latch configured for removable receipt in the first recess, and a stop configured for receipt in the second recess to selectively lock the accessory to the rail.

In aspects, the accessory may include a body and a knife movably coupled to the body.

In aspects, the latch may be slidably coupled to the body of the accessory and has a first end accessible from externally of the body, and an opposite second end configured for receipt in the first recess of the rail.

In aspects, the latch may be configured to move relative to the body of the accessory between a first position and a second position. In the first position, the second end of the latch may be disposed within the first recess of the rail. In the second position, the second end of the latch may be disposed outside of the first recess of the rail.

In aspects, the rail may further include a second extension extending laterally outward from a second side of the elongated body. The second extension may be configured for slidable receipt in a corresponding channel defined in another accessory.

In aspects, the accessory may include at least one of a knife, a storage box, or a tool.

In accordance with additional aspects of the present disclosure, a modular wallet assembly is provided and includes a housing, a rail, and first and second accessories. The housing defines an internal chamber configured for receipt of personal items. The rail includes an elongated body configured to be fixed to the housing, a first extension extending laterally outward from a first side of the elongated body, and a second extension extending laterally outward from a second side of the elongated body. The first accessory defines a longitudinally-extending channel configured for slidable receipt of the first extension to selectively lock the first accessory to the housing. The second accessory defines a longitudinally-extending channel configured for slidable receipt of the second extension to selectively lock the second accessory to the housing.

In aspects, the first extension may have a flange extending along a length thereof. The flange may have a first end defining a first recess therein, and an opposite second end defining a second recess therein. The first accessory may include a movable latch configured for removable receipt in the first recess, and a stop configured for receipt in the second recess to selectively lock the first accessory to the rail.

In aspects, the first and/or second accessory may be a storage box that includes a housing having an opened top end, and a door configured to selectively cover the opened top end of the housing.

Further details, advantages, and aspects of exemplary embodiments of the present disclosure are described in more detail below with reference to the appended figures.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

As used herein, the terms parallel and perpendicular are understood to include relative configurations that are substantially parallel and substantially perpendicular up to about + or −15 degrees from true parallel and true perpendicular.

BRIEF DESCRIPTION OF THE DRAWINGS

Embodiments of the present disclosure are described herein with reference to the accompanying drawings, wherein.

DETAILED DESCRIPTION

Figure 1:
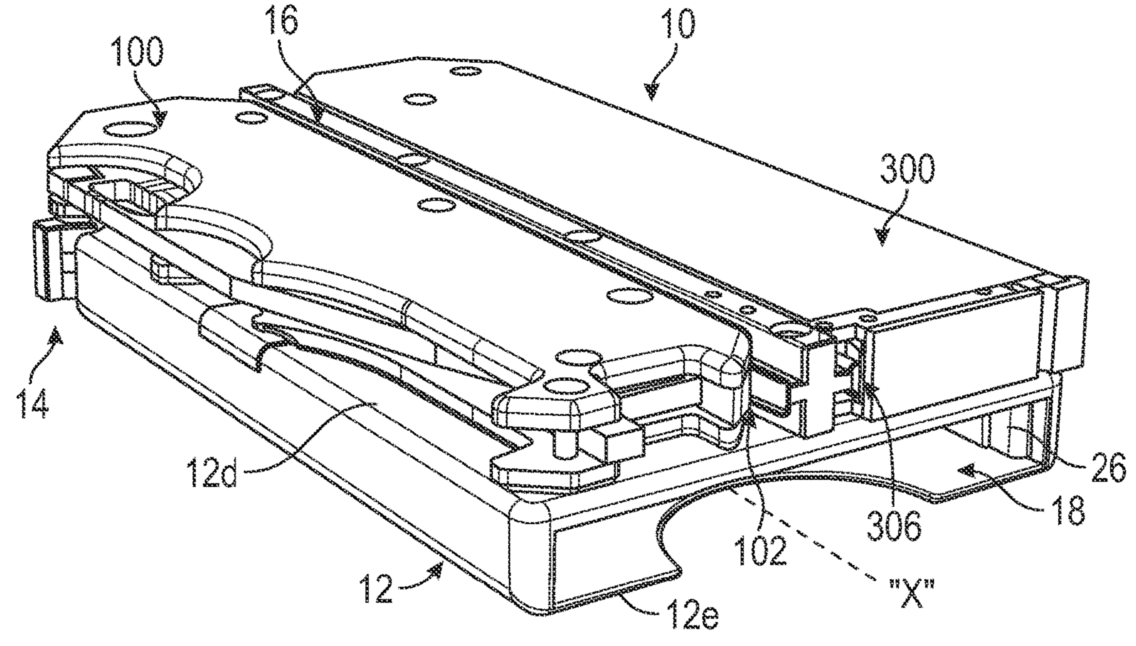
FIG. 1 is a perspective view illustrating an exemplary embodiment of a modular wallet assembly in accordance with the principles of the present disclosure.

Embodiments of the presently disclosed wallets and methods of use are described in detail with reference to the drawings, in which like reference numerals designate identical or corresponding elements in each of the several views.

Figure 2:
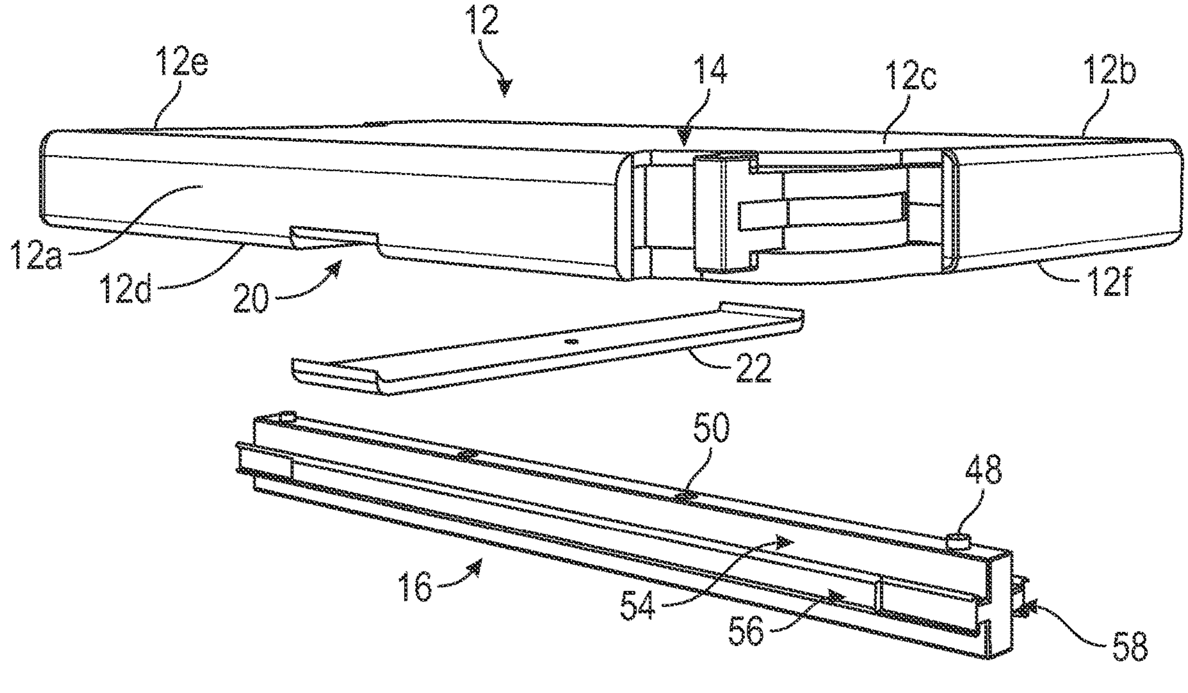
FIG. 2 is a bottom perspective view, with parts separated, illustrating a wallet housing and rail of the modular wallet assembly of FIG. 1.
Figure 3:
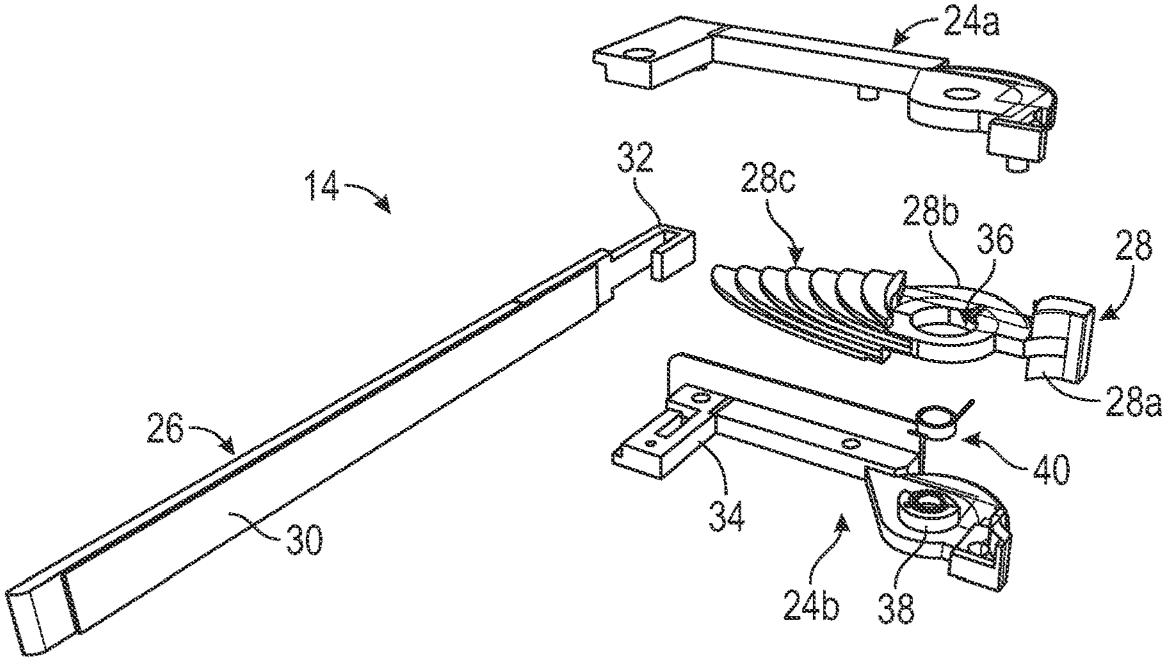
FIG. 3 is a perspective view, with parts separated, illustrating a card-dispensing mechanism of the modular wallet assembly of FIG. 1.
Figure 4:
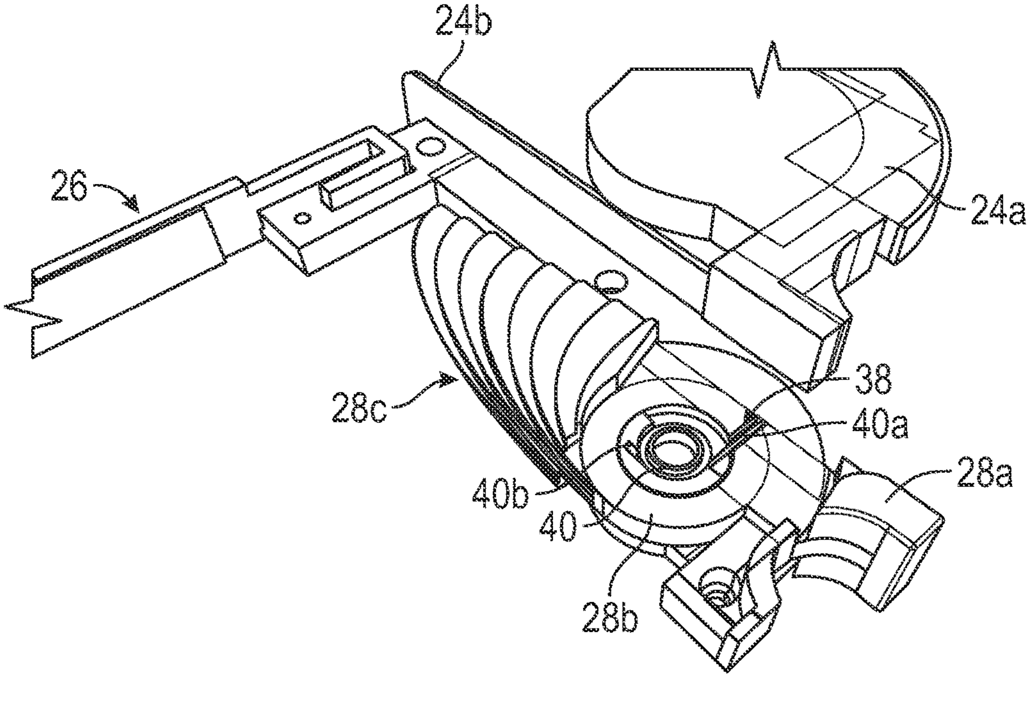
FIG. 4 is a partially assembled perspective view illustrating the card-dispensing mechanism of FIG. 3.
Figure 5:
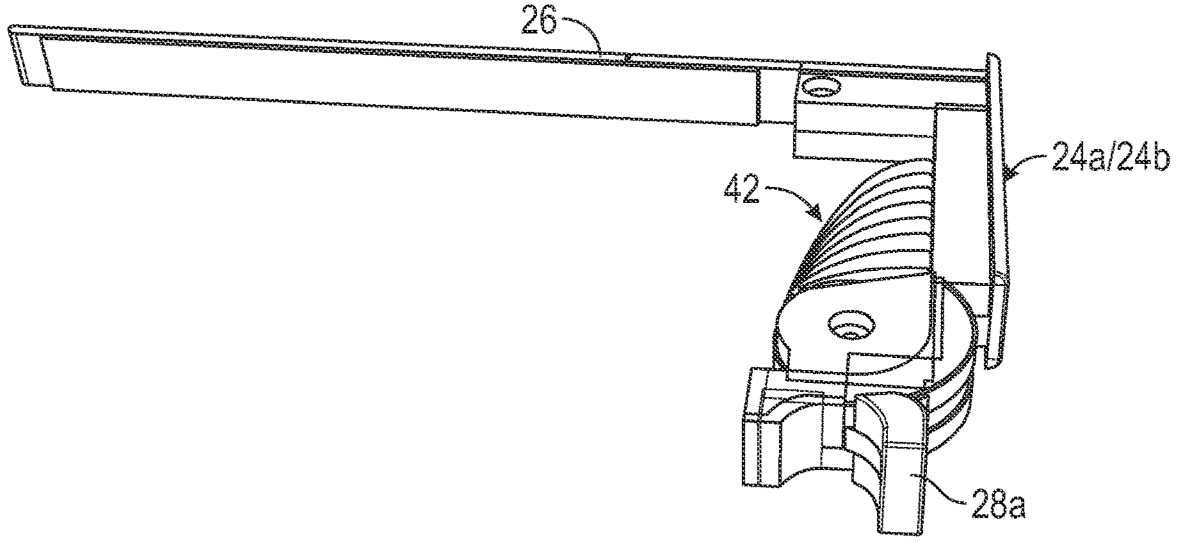
FIG. 5 is an assembled perspective view illustrating the card-dispensing mechanism of FIG. 3.

Referring initially to FIGS. 1 and 2, illustrated is a modular wallet assembly 10 for storing a plurality of personal items (e.g., personal cards, cash, etc.) and easily reconfigurable to support a plurality of accessories 100, 200, 300 thereon. In some embodiments, the modular wallet assembly 10 may be a stand-alone device or sized and dimensioned to be coupled to an electronic device, such as, for example, a mobile phone, or a mobile phone case.

The modular wallet assembly 10 generally includes a housing or case 12, a card-dispensing mechanism 14, a rail 16, and one or more accessories 100, 200, 300 configured to couple to the housing 12 via the rail 16. The housing 12 may have a planar rectangular shape and has a pair of opposing longitudinal side walls 12*a*, 12*b*, opposed lower and upper surfaces 12*c*, 12*d*, and an opened top end 12*e* and an opposite bottom end 12*f*. The housing 12 defines an internal chamber 18 therein configured for receipt of a plurality of personal cards "C" (FIG. 8) (e.g., credit cards, ID cards, etc.) and a longitudinal axis "X" that extends between the top and bottom ends 12*e*, 12*f*. The upper surface 12*d* of the housing 12 may define a transverse depression 20 therein configured for receipt of a strap "S" (FIG. 8) configured to hold cash or other suitable items to the outside of the casing 12. A cover 22 (FIG. 2) may be provided to cover the depression 20 when the strap "S" is not in use.

With reference to FIGS. 3-8, the card-dispensing mechanism 14 includes a base 24*a*, 24*b*, a longitudinal element 26, and a lever arm 28 pivotably received in the bottom end 12*f* (FIG. 2) of the housing 12. The longitudinal element 26 is received in the internal chamber 18 of the housing 12 and is fixed to the side wall 12*b* of the housing 12. The longitudinal element 26 may have a friction-enhancing material 30, such as, for example, foam, rubber, or Velcro directed to the inside of the housing 12 to assist in supporting the personal cards "C" in the internal chamber 18. The longitudinal element 26 has an end 32 having a hooked shape configured to securely engage a correspondingly-shaped end 34 of the base 24*a*, 24*b*. The base 24*a*, 24*b* may include an assembly of parts 24*a*, 24*b* configured to capture the lever arm 28 therebetween and pivotably support the lever arm 28. The base 24*a*, 24*b* is fixed within the bottom end 12*f* of the housing 12.

Figure 6:
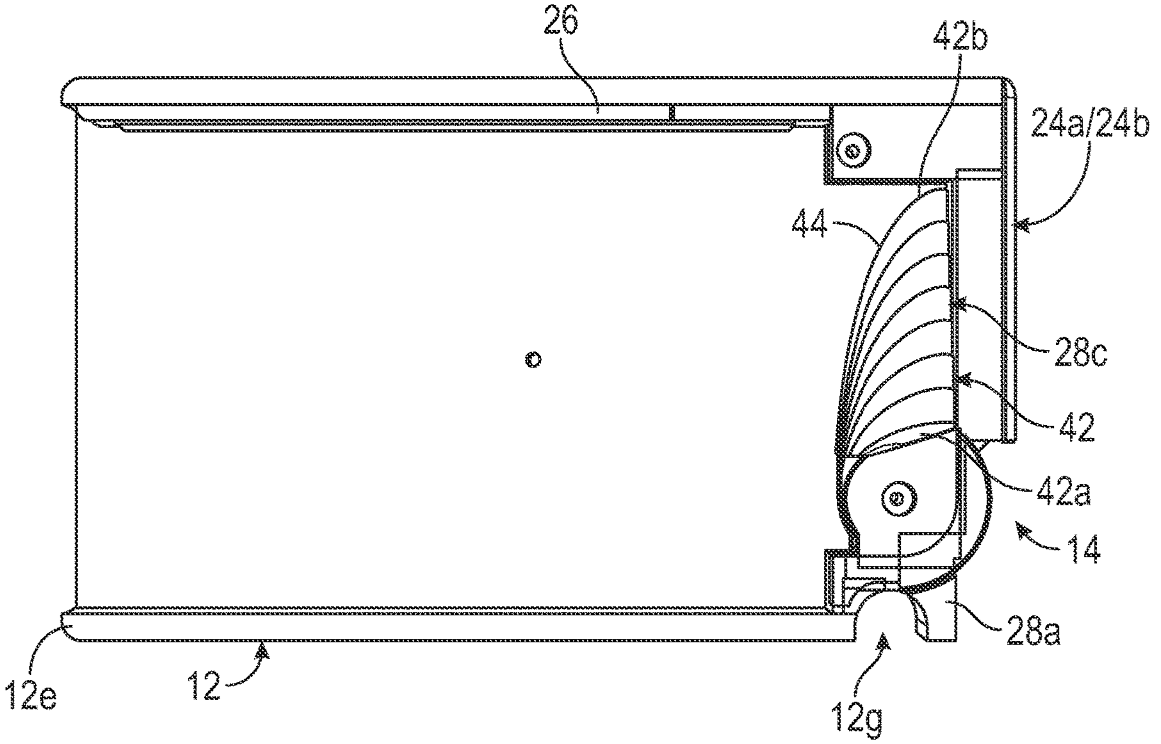
FIG. 6 is a top view, with a top of a housing removed, illustrating the card-dispensing mechanism of FIG. 3 in a first position.
Figure 7:
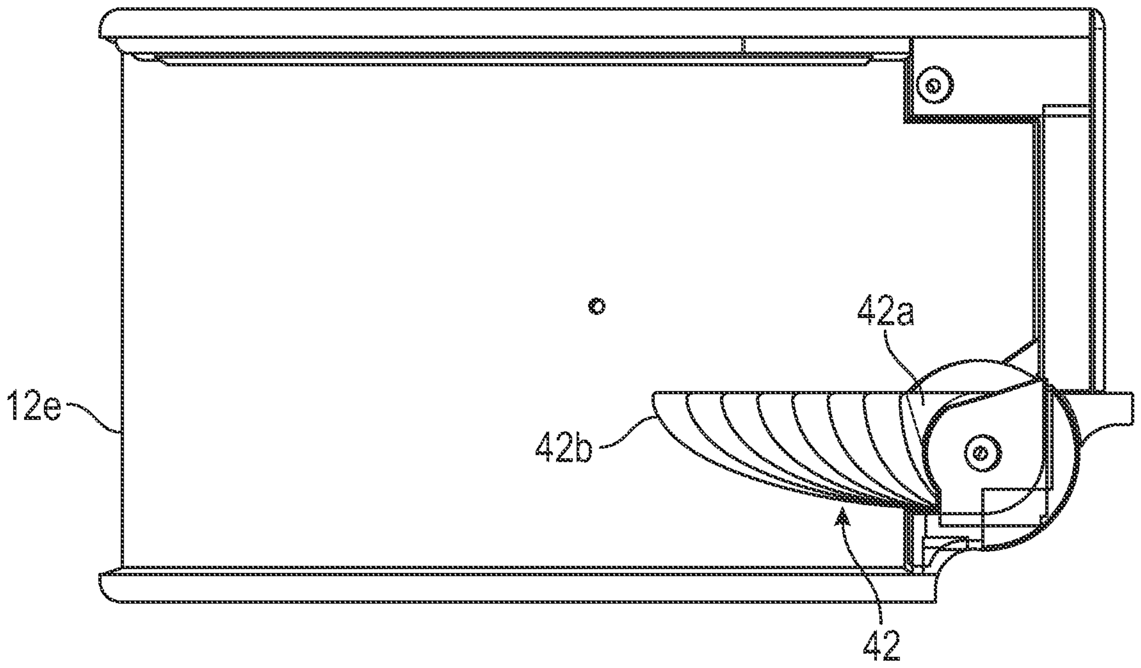
FIG. 7 is a top view, with the top of the housing removed, illustrating the card-dispensing mechanism of FIG. 3 in a second position.

The lever arm 28 has a first end portion 28*a* protruding out of a lower corner 12*g* (FIG. 6) of the housing 12, an intermediate portion 28*b* pivotably supported between the parts 24*a*, 24*b* of the base, and a second end portion 28*c* disposed within the housing 12. The first end portion 28*a* of the lever arm 28 may be in the form of a finger-actuation button that is accessible externally of the housing 12 to allow a user to actuate the lever arm 28 between a first position, as shown in FIG. 6, and a second position, as shown in FIG. 7. The intermediate portion 28*b* of the lever arm 28 defines a central opening 36 having a cylindrical pivot member 38 of the base 24*b* extending therethrough to rotationally support the lever arm 28. The intermediate portion 28*b* of the lever arm 28 further defines an opening 38 having a first end 40*a* of a biasing member 40 (e.g., a torsion spring) received therein. The pivot member 38 of the base 24*b* captures a second end 40*b* of the biasing member 40 therein. As such, biasing member 40 is configured to resiliently bias the lever arm 28 toward the first position. Other types of biasing members are also contemplated, such as, for example, a leaf spring. In other aspects, no biasing member is provided so that a user manually moves the lever arm 28 from the second position to the first position.

Figure 8:
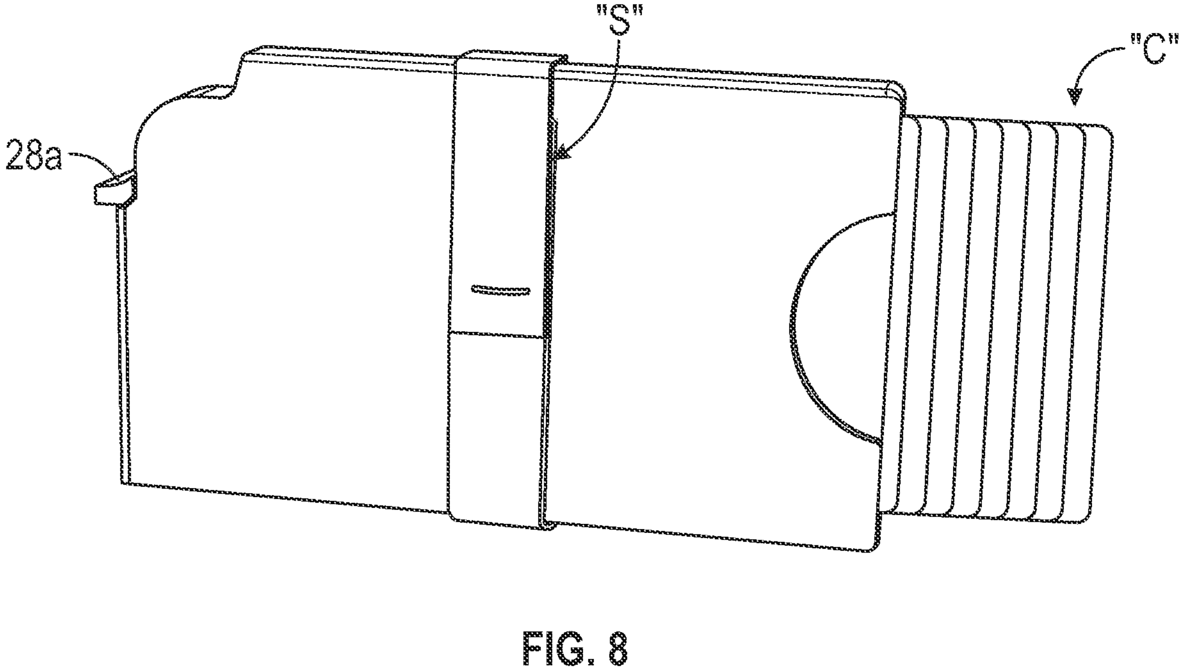
FIG. 8 is a perspective view illustrating a plurality of personal cards extended from the modular wallet assembly.

The second end portion 28*c* of the lever arm 28 has a plurality of steps 42 each disposed on a discrete plane from one another and configured to engage a respective personal card "C" of a plurality of personal cards stored within the housing 12. The steps 42 each have an arcuate-shaped (e.g., elliptical-shaped) edge 44 configured to engage and urge a bottom edge of a discrete personal card "C" along the longitudinal axis "X" (FIG. 1) of the housing 12 and out of the opened top end 12*e* of the housing 12 at discrete distances when the lever arm 28 is pivoted from the first position toward the second position, as shown in FIG. 8.

In the first position (FIG. 6), the lever arm 28 extends perpendicularly relative to the longitudinal axis "X," and in the second position (FIG. 7), the lever arm 28 extends parallel with the longitudinal axis "X." The edge 44 of each successive step 42, moving in a direction from the first end portion 28*a* toward the second end portion 28*c*, has a lower radius of curvature (e.g., a larger radius) than the preceding step 42. As such, when the lever arm 28 is in the second position, as shown in FIG. 7, an end-most step 42*b* is disposed closer to the opened top end 12*e* of the housing 12 than a first step 42*a* that closest to a rotational axis of the lever arm 28.

Figure 9:
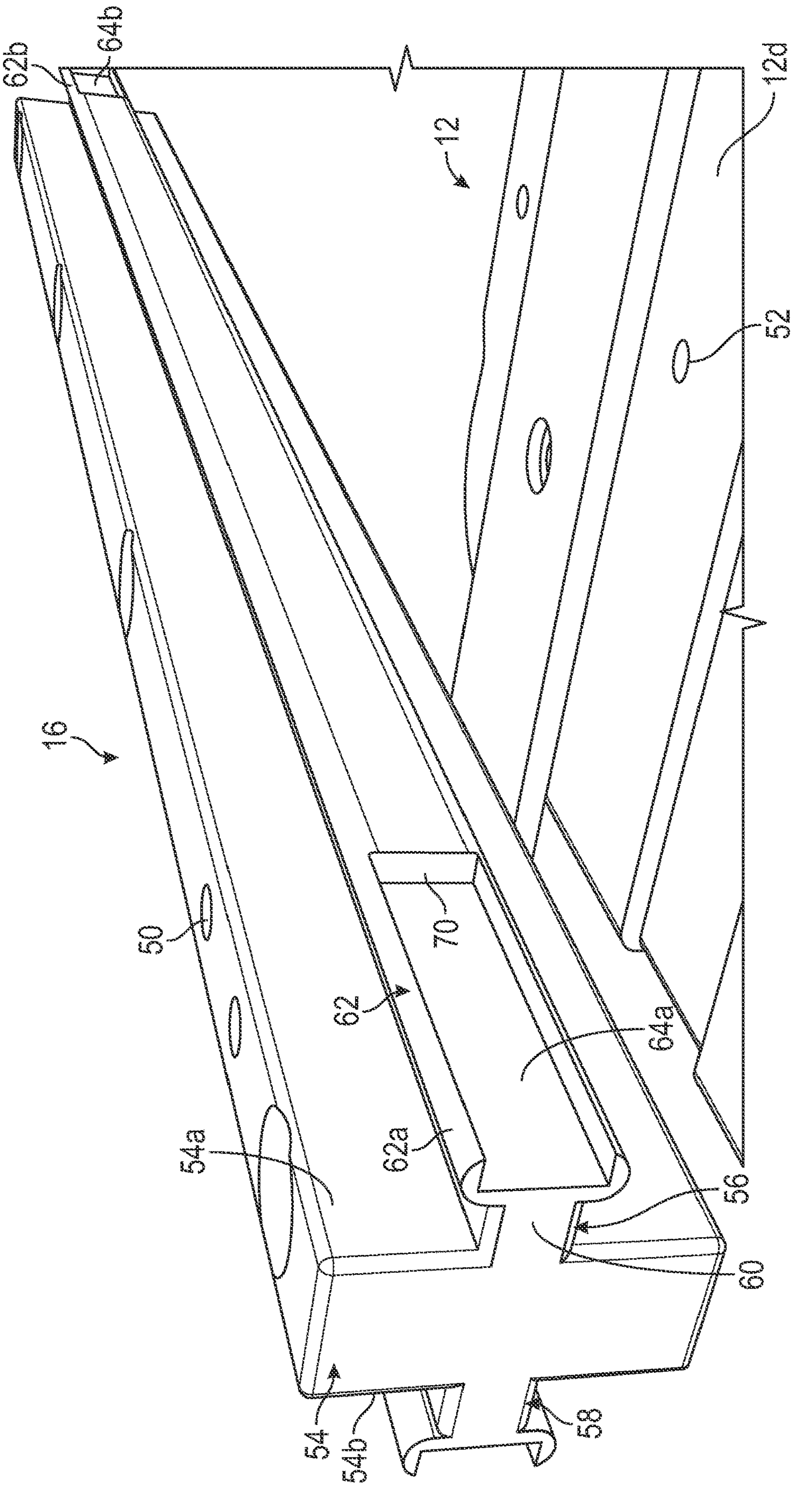
FIG. 9 is a perspective view, with parts separated, illustrating the rail detached from the housing of the modular wallet assembly.

With reference to FIGS. 1, 2, and 9, the rail 16 of the modular wallet assembly 10 is configured to be removably or permanently affixed to the upper surface 12*d* of the housing 12 and to detachably couple two of a plurality of accessories 100, 200, or 300 to the housing 12. For example, the rail 16 may be fixed to the housing 12 via a plurality of fasteners 48, such as, for example screws. The rail 16 may have a plurality of holes 50 extending therethrough, and the upper surface 12*d* of the housing 12 may have a plurality of corresponding threaded holes 52 configured to threaded receipt of the fasteners 48 to secure the rail 16 to the housing 12 such that the rail 16 extends parallel with the longitudinal axis "X" of the housing 12 and a long a central location of the housing 12. Other means for attaching the rail 16 to the housing 12 are contemplated, such as, for example, Velcro, adhesive, a tongue-in-groove connection, a bayonet-type connection, or the like. In aspects, any suitable number of rails 16 may be stacked on top of one another via any suitable fastening engagement. In aspects, the rail 16 may be directly coupled to a phone or a phone case instead of the housing 12 of the modular wallet assembly 10.

Figure 12:
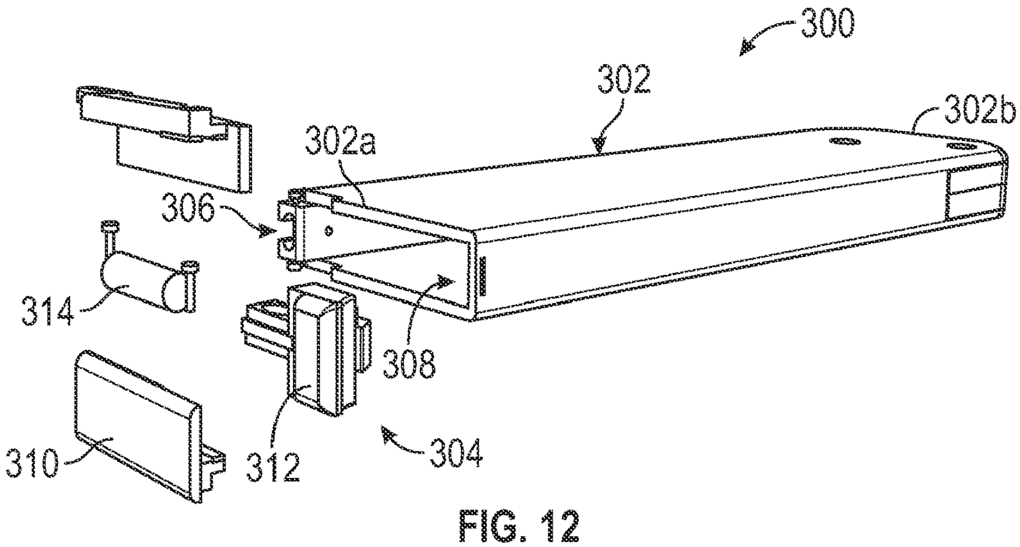
FIG. 12 is a perspective view, with parts separated, of a storage box accessory of the modular wallet assembly configured for detachable engagement with the rail.

The rail 16 includes an elongated body 54 having a first lateral side 54*a* and an opposite second lateral side 54*b*, a first extension 56 extending laterally outward from the first lateral side 54*a* of the elongated body 54, and a second extension 58 extending laterally outward from the second lateral side 54*b* of the elongated body 54. The elongate body 54 is configured to be affixed to the housing 12, the first extension 56 is configured for slidable receipt in a corresponding channel 102 defined in the first accessory 100 (FIG. 1), and the second extension 58 is configured for slidable receipt in a corresponding channel 306 defined in the second accessory 300 (FIGS. 1 and 12). Since the first and second extensions 56, 58 of the rail 16 are identical or substantially similar, only details of the first extension 56 will be provided herein.

With continued reference to FIG. 9, the first extension 56 of the rail 16 has a bar 60 extending perpendicularly from the first lateral side 54*a* of the elongated body 54, and an elongated flange 62 extending along a length of the bar 60. The flange 62 protrudes outwardly from opposite sides of the bar 60 and has a first end portion 62*a* and an opposite second end portion 62*b*. The first end portion 62*a* of the flange 62 defines a flat-bottomed first recess 64*a* therein, and the second end portion 62*b* of the flange 62 defines a flat-bottomed second recess 64*b* therein.

Figure 10A:
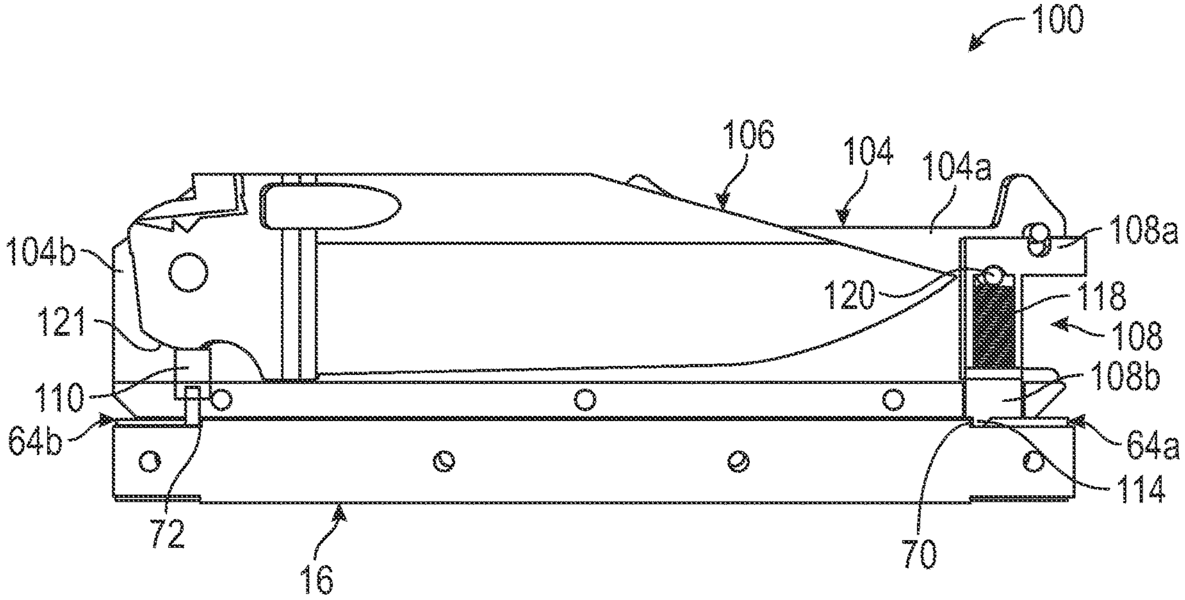
FIG. 10A is a side view of a knife accessory of the modular wallet assembly shown engaged to the rail of FIG. 9.
Figure 10B:
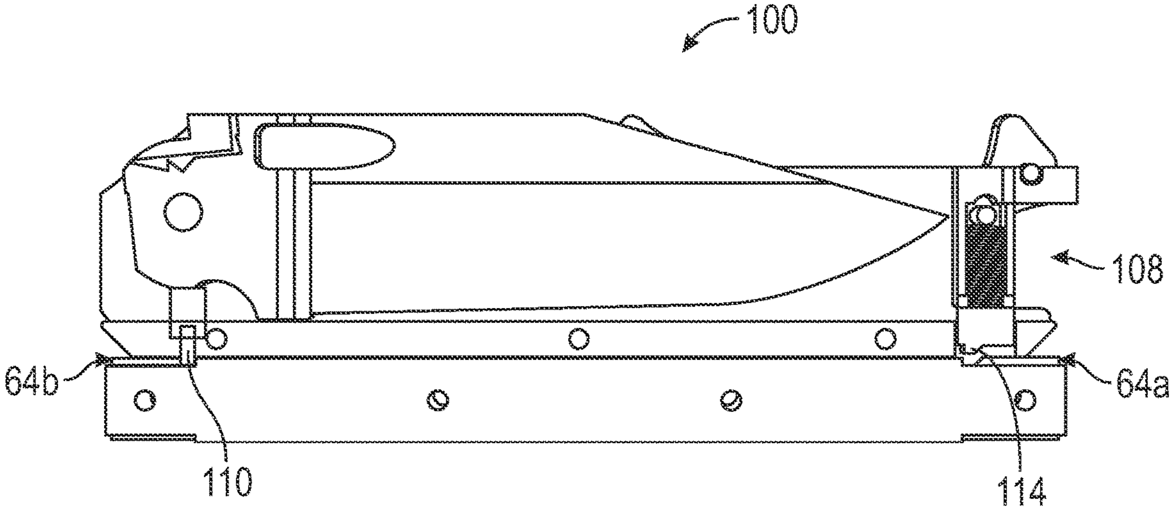
FIG. 10B is a side view of the knife accessory of FIG. 10A shown being disengaged from the rail.

With reference to FIGS. 1, 10A and 10B, the accessory 100 is a knife accessory and includes a body or casing 104, a knife 106 pivotably supported in the casing 104, a movable latch 108, and a stop 110. The casing 104 of the knife accessory 100 has a first end portion 104*a* and an opposite second end portion 104*b* and defines the channel 102 (FIG. 1) extending therebetween. The latch 108 is axially supported in the first end portion 104*a* of the casing 104, and the stop 110 is fixed in the second end portion 104*b* of the casing 104.

The latch 108 is slidably coupled to the casing 104 and has a first end portion 108*a* accessible from externally of the casing 104, and an opposite second end portion 108*b* extending into the channel 102 of the casing 104 and configured for receipt in the first recess 64*a* (FIG. 9) of the rail 16. The second end portion 108*b* of the latch 108 may have a tooth 114 or other suitable surface feature configured to extend into the first recess 64*a* and to catch or engage a lip 70 in the first recess 64*a*. The latch 108 defines a cavity between the first and second end portions 108*a*, 108*b* thereof having a biasing member 118 (e.g., a coil spring) disposed therein. The biasing member 118 presses against a stop or pin 120 fastened to the casing 104 and resiliently biases the latch member 108 toward a first position (FIG. 10A). The stop or pin 110 in the second end portion 104*a* of the casing 104 extends into the channel 102 of the casing 104 and is configured for receipt in the second recess 64*b* of the rail 16. The stop 110 is also configured to engage a bottom end 121 of the knife 106 to assist in maintaining the knife 106 in a selected position.

In aspects, the casing 104 may define a bottle opener. In further aspects, a money clip (not explicitly shown) may be provided, which is configured to detachably couple to the rail 16 and/or housing 12 via a fastener, such as, for example, a bolt.

Alternatively or additionally, the rail 16 may have a plurality of pegs (not explicitly shown) extending upwardly therefrom and the casing 104 of the accessory 100 may have a plurality of corresponding keyhole fittings (not explicitly shown) configured for detachable receipt of the pegs to assist in securing the accessory 100 to the rail 16. Other suitable fastening engagements between the rail 16 and the casing 14 are also contemplated, such as, for example, friction-fit engagement, a bayonet-type connection, or the like.

In use, with reference to FIGS. 10A and 10B, to attach the knife accessory 100 to the housing 12 (FIG. 1) of the modular wallet assembly 10, the first extension 56 (FIG. 9) of the rail 16 is guided through the correspondingly-shaped channel 102 in the casing 104 of the accessory 100 by first inserting the second end portion 62*a* of the flange 62 into the first end portion 104*a* of the casing 104. As the tooth 114 of the latch 108 passes over a lip 72 (FIG. 10A) of the second recess 64*b* of the rail 16, the latch 108 is moved against the resilient bias of the biasing member 118 from the first position to the second position. The first extension 56 of the rail 16 is further guided through the channel 102 of the casing 104 until the latch 108 overlaps with the first recess 64*a* of the rail 16 and the stop 110 is received in the second recess 64*b* of the rail 16. With the latch 108 overlapping the first recess 64*a* of the rail 16, the biasing member 118 moves the latch 108 to position the tooth 114 of the latch 108 in the first recess 64*a* of the rail 16 and against the lip 70. In this state, the accessory 100 is selectively locked to the rail 16, and therefore, the housing 12, and prevented from sliding off of the rail 16 in either direction.

Figure 11:
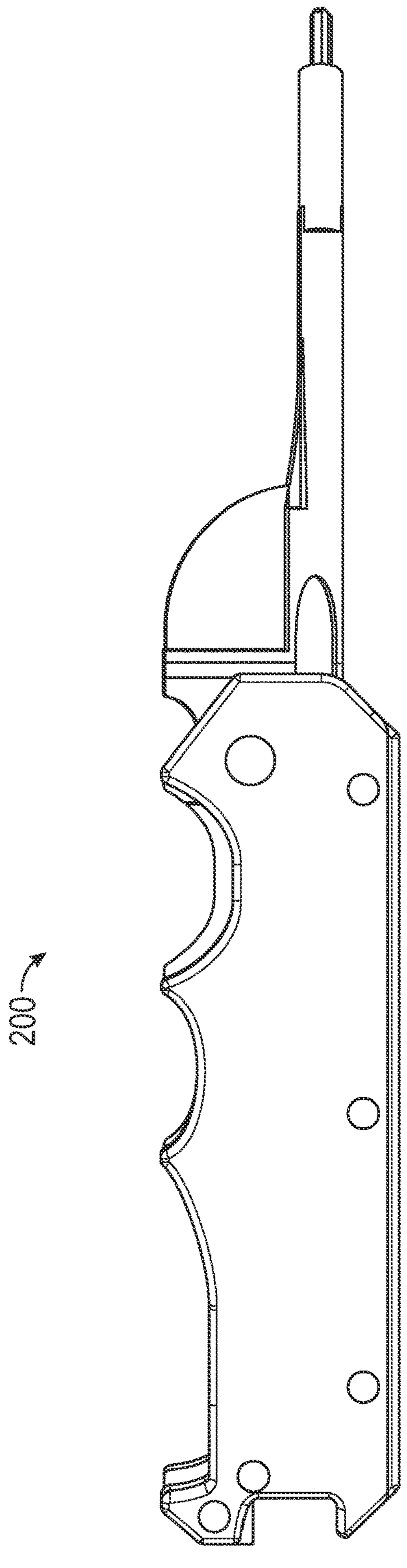
FIG. 11 is a side view of a tool accessory of the modular wallet assembly configured for detachable engagement with the rail.
Figure 13A:
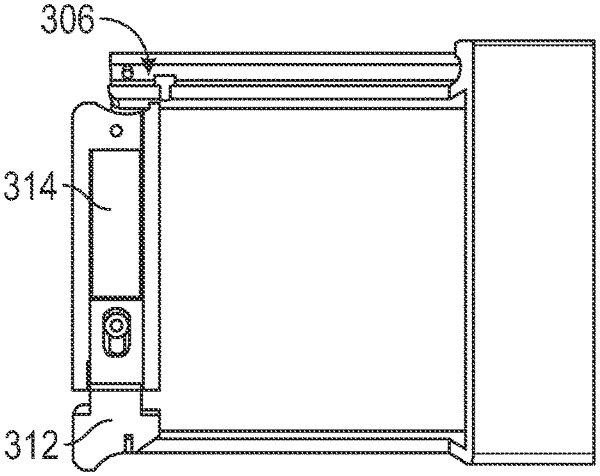
FIG. 13A is a cutaway view illustrating a button of the storage box accessory in a locked state.
Figure 13B:
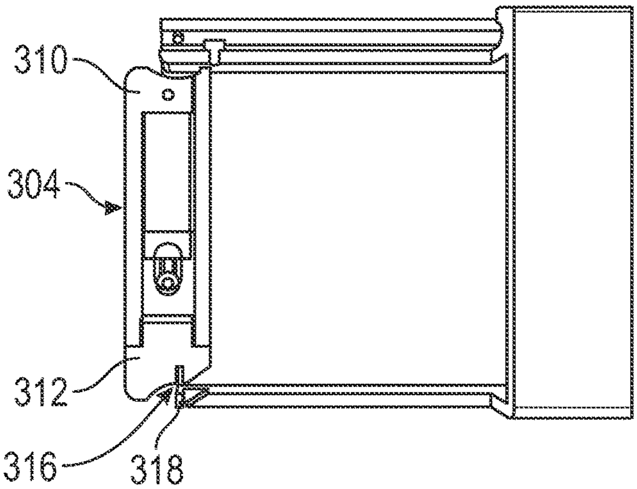
FIG. 13B is another cutaway view illustrating the button of the storage box accessory in an unlocked state.
Figure 14:
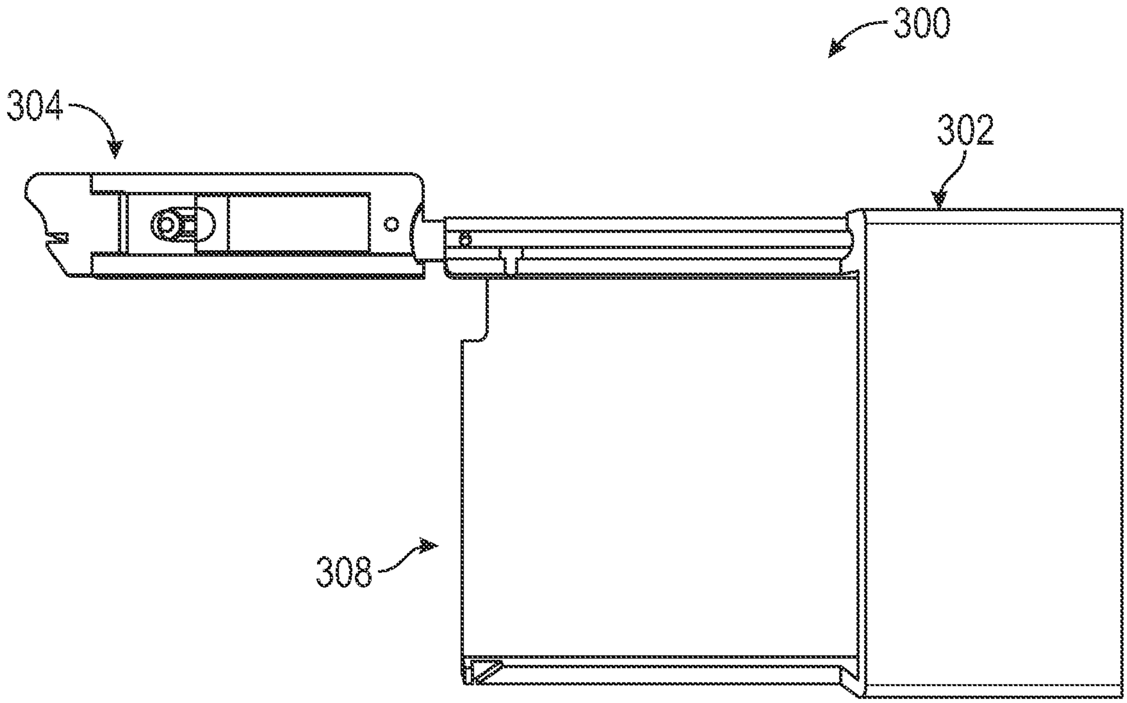
FIG. 14 is yet another cutaway view illustrating a door of the storage box accessory in an opened state.

To detach the accessory 100 from the rail 16, a user lifts the latch 108 to dislodge the tooth 114 of the latch 108 from the first recess 64*a* of the flange 62 of the rail 16. While holding the latch 108 in the second position (FIG. 10B), the rail 16 and the accessory 100 may be slid relative to one another to detach the accessory 100 from the rail 16. It is contemplated that other accessories may then be attached to the rail 16, such as, for example, a screw driver accessory 200 (FIG. 11) or a storage box accessory 300 (FIGS. 12-14). It is contemplated that each of the accessories 200, 300 defines a longitudinally-extending channel configured for slidable receipt of the flange 62 of the rail 16. It is contemplated that the rail 16 may be configured to connect to any suitable tool accessory, such as, for example, a wrench, pliers, flashlight, or the like.

With reference to FIGS. 12-14, the storage box accessory 300 includes a housing 302 and a door 304 hingedly coupled to the housing 302. The housing 302 of the storage box accessory 300 defines a longitudinally-extending channel 306 configured for receipt of the first or second extension 56, 58 (FIG. 9) of the rail 16. The housing 302 has an opened top end 302*a*, a closed bottom end 302*b*, and an internal storage chamber 308 defined therebetween. It is contemplated that the housing 302 incorporates the same latching mechanism (e.g., the latch member 108 and stop 110) as the knife accessory 100 for detachably coupling the storage box accessory 300 to the rail 16.

The door 304 may be an assembly of parts including an arm 310 pivotably coupled to the opened first end 302*a* of the housing 302, a button 312, and a biasing member 314. The biasing member 314 is supported between the button 312 and the arm 310 to resiliently bias the button 312 toward a first position (FIG. 13A). The button 312 defines a recess 316 therein and the opened top end 302*a* of the housing 302 has a catch 318 or surface feature configured for receipt in the recess 316 of the button 312 when the button 312 is in the first position to prevent the door 304 from opening relative to the housing 302.

In use, to unlock the door 304 from the housing 302, a user pushes the button 312 to move the button 312 relative to the arm 310 from the first position (FIG. 13A) to a second position (FIG. 13B) to disengage the catch 318 from the recess 316 of the button 312. While holding the button 312 in the second position, the door 304 may be pivoted outwardly (FIG. 14) to allow access to the internal storage chamber 308.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed is:

1. A modular wallet assembly, comprising:
- a housing defining an internal chamber configured for receipt of personal items;
- a rail including:
  - an elongated body configured to be fixed to the housing;
  - a first extension extending laterally outward from a first side of the elongated body, wherein the first extension has a flange extending along a length thereof, wherein the flange has a first end defining a first recess therein, and an opposite second end defining a second recess therein; and
  - a second extension extending laterally outward from a second side of the elongated body;
- a first accessory defining a longitudinally-extending channel configured for slidable receipt of the first extension to selectively lock the first accessory to the housing, wherein the first accessory includes a movable latch configured for removable receipt in the first recess, and a stop configured for receipt in the second recess to selectively lock the first accessory to the rail; and
- a second accessory defining a longitudinally-extending channel configured for slidable receipt of the second extension to selectively lock the second accessory to the housing.

2. The modular wallet assembly according to claim 1, wherein at least one of the first or second accessories is a storage box including:
- a housing having an opened top end; and
- a door configured to selectively cover the opened top end of the housing.

3. The modular wallet assembly according to claim 1, further comprising:
- a lever arm disposed at a bottom end of the housing and configured to pivot relative to the housing between a first position and a second position.

4. The modular wallet assembly according to claim 3, wherein the lever arm includes at least three steps each configured to engage a respective personal card of a plurality of personal cards.

5. The modular wallet assembly according to claim 4, wherein the at least three steps are configured to urge the plurality of personal cards along a longitudinal axis of the housing and out of an opened top end of the housing at discrete distances when the lever arm is pivoted from the first position toward the second position.

6. The modular wallet assembly according to claim 5, wherein each step of the at least three steps has an arcuate-shaped edge.

7. The modular wallet assembly according to claim 6, wherein the lever arm includes a proximal end portion and a distal end portion.

8. The modular wallet assembly according to claim 7, wherein moving in a direction from the proximal end portion of the lever arm to the distal end portion of the lever arm, the arcuate-shaped edge of each successive step of the at least three steps has a larger radius than a radius of the arcuate-shaped edge of a preceding adjacent step.

9. The modular wallet assembly according to claim 1, wherein the rail is configured to couple a second accessory to the housing.

10. The modular wallet assembly according to claim 9, wherein the second accessory includes:
- a body; and
- a knife movably coupled to the body.

11. A modular wallet assembly, comprising:
- a housing defining an internal chamber configured for receipt of personal items;
- a rail including:
  - an elongated body configured to be fixed to the housing;
  - a first extension extending laterally outward from a first side of the elongated body, wherein the first extension has a flange extending along a length thereof, wherein the flange has a first end defining a first recess therein, and an opposite second end defining a second recess therein;
  - a second extension extending laterally outward from a second side of the elongated body; and a first accessory including a movable latch configured for removable receipt in the first recess, and a stop configured for receipt in the second recess to selectively lock the first accessory to the rail.

12. The modular wallet assembly according to claim 11, wherein the rail is configured to couple an accessory to the housing.

13. The modular wallet assembly according to claim 12, wherein the accessory includes:

a body; and a knife movably coupled to the body.

14. The modular wallet assembly according to claim 11, further comprising:

a lever arm disposed at a bottom end of the housing and configured to pivot relative to the housing between a first position and a second position.

15. The modular wallet assembly according to claim 14, wherein the lever arm includes at least three steps each configured to engage a respective personal card of a plurality of personal cards.

* * * * *